United States Patent [19]

Kelly

[11] Patent Number: 5,263,277
[45] Date of Patent: Nov. 23, 1993

[54] APPARATUS FOR CATCHING FISH AND REMOVING TWIST FROM TWISTED FISHING LINE

[76] Inventor: David J. Kelly, 300 8th St., Oakmont, Pa. 15139

[21] Appl. No.: 938,284

[22] Filed: Aug. 31, 1992

[51] Int. Cl.$^5$ ............................................. A01K 91/00
[52] U.S. Cl. ..................................... 43/43.13; 43/42.46
[58] Field of Search .................. 43/42.19, 42.2, 43.13, 43/42.46, 42.06, 42.21, 42.25, 42.35

[56] References Cited

U.S. PATENT DOCUMENTS

| | | | |
|---|---|---|---|
| 1,009,363 | 11/1911 | Winnie | 43/42.25 |
| 1,708,825 | 4/1929 | Barclay | 43/42.06 |
| 1,758,344 | 5/1930 | Wright et al. | |
| 2,003,245 | 5/1935 | Carey | 117/1 |
| 2,733,538 | 2/1956 | Alimas | 43/43.13 |
| 2,745,206 | 5/1956 | Gaw | 43/42.06 |
| 2,769,271 | 11/1956 | Smith | 43/43.13 |
| 2,783,579 | 3/1957 | Casper | 43/42.19 |
| 2,885,818 | 5/1959 | Frederiksen | 43/42.19 |
| 2,911,751 | 11/1959 | Mason | 43/42.06 |
| 2,967,372 | 1/1961 | Pass et al. | 43/43.13 |
| 3,145,498 | 8/1964 | Kochis | 43/43.13 |
| 3,156,065 | 11/1954 | Klammer | 43/43.13 |
| 3,238,660 | 3/1966 | Pcola | 43/43.13 |
| 3,367,059 | 2/1968 | Puls et al. | 43/42.14 |
| 3,494,063 | 2/1970 | Treaster | 43/42.14 |
| 3,541,720 | 11/1970 | Buffet | 43/42.19 |
| 3,858,344 | 1/1975 | Watts | 43/43.13 |
| 3,971,153 | 7/1976 | Harms | 43/43.13 |
| 4,110,930 | 9/1978 | Daniels | 43/42.14 |
| 4,447,980 | 5/1984 | Bassett | 43/42.2 |
| 4,501,087 | 2/1985 | Blomquist | 43/42.06 |
| 4,625,448 | 12/1986 | Borders | 43/42.11 |
| 5,016,386 | 5/1991 | Lamonica et al. | 43/42.14 |

FOREIGN PATENT DOCUMENTS

| | | | |
|---|---|---|---|
| 0544157 | 7/1957 | Canada | 43/42.19 |
| 0585291 | 2/1959 | Canada | 43/42.06 |
| 0021141 | of 1895 | United Kingdom | 43/42.46 |
| 0191993 | 1/1923 | United Kingdom | 43/43.13 |

Primary Examiner—Mark Rosenbaum
Assistant Examiner—James Miner
Attorney, Agent, or Firm—Kirkpatrick & Lockhart

[57] ABSTRACT

An apparatus for attracting and catching fish while removing the twist in twisted fishing line. The device may comprise a body member that is adapted to be attached directly to the end of the twisted line. The body may be shaped such that when drawn through water it will impart a rotary motion to the twisted line or it may have fins attached thereto that cause the body to rotate in a desired direction as it is drawn through the water. A swivel is used to fasten a hook to the body and to disrupt the rotary motion that is transferred to the hook.

20 Claims, 4 Drawing Sheets

APPARATUS FOR CATCHING FISH AND REMOVING TWIST FROM TWISTED FISHING LINE

BACKGROUND OF THE INVENTION

1. Field of the Invention

The invention relates to lures for catching fish and, in particular, to fish lures adapted to remove the twist in twisted fishing line.

2. Description of the Invention Background

Most people who enjoy fishing with rods and reels have encountered, at one time or another, problems with their fishing line becoming twisted during use. Twisted fishing line can cause a variety of problems ranging from excessive line wear and breakage to difficulties in casting and retrieving a lure or hook that is attached thereto.

Line twist can occur with all types of commercially available fishing reels. Most fishing reels typically employ a spool member to store the fishing line thereon. The fishing line is wound onto the spool member in response to the manual cranking of a hand crank that is rotatably attached to the reel. One type of fishing reel, commonly known as a spinning reel, employs a non-rotating spool member for receiving and storing the fishing line. The fishing line is wound onto the spool by a bail member that revolves around the spool in response to a hand operated crank.

Spinning reels, as described above, are commonly plagued with the problem of line twist which can be caused by a number of reasons. For example, line twist may be caused as the bail member winds the line onto the spool. The amount of twist introduced into the line is generally increased each time the line is rewound onto the spool by repeated casting and retrieval of the line. The line typically continues to be twisted in this manner until eventually a portion of the twisted line unravels from the spool thus rendering the reel temporarily inoperable. To correct the problem, the unraveled line is typically cut from the spool and discarded.

Twist may be also introduced into the line each time line is pulled from the spool by the person operating the reel or by a hooked fish as it is being landed. Further, line twist may also be created by improper installation of the line onto the reel.

Line twist may also be amplified by the movement of the fishing lure or bait that is attached to the end of the fishing line. Some fishing line attachments and devices, however, such as the ones disclosed in U.S. Pat. No. 2,733,538 to Alimas and in U.S. Pat. No. 2,769,271 to Smith are specifically designed to resist twisting of the line as the result of motions or movements of the bait or lure as it is drawn through the water by the fishing line. However, once the line is twisted, for example, by the reel, those devices are ill-suited for removing the twist therefrom.

Other devices such as the ones disclosed in U.S. Pat. No. 2,967,372 to Pass et al., and U.S. Pat. No. 3,971,153 to Harms are adapted to remove the twist from twisted fishing line. Another device, disclosed in U.S. Pat. No. 2,003,245 to Carey, is adapted to re-twist a fishing line as desired. Those devices are generally constructed to impart a rotary motion to the end of the twisted line as the device is drawn through the water. To use those devices, however, the lure or hook that is currently attached to the end of twisted line must first be removed before the twist removing or twist installing device can be attached to the end of the twisted line. Thereafter, the device is cast into the water and retrieved therethrough to impart the desired rotational motion to the line.

Inasmuch as each of those devices generally create a whirling disturbance in the water, they can, at times, attract fish. However, those devices, due to their rotational motion are generally ill-suited to have a hook attached thereto because the hook would also rotate at the same speed as the device as it is drawn through the water. As such, when using any of the above-mentioned twist removing devices, an angler may forego a number of fish catching opportunities. Thus the need exists for a device that is adapted to attract and catch fish while removing the twist from twisted fishing line.

SUMMARY OF THE INVENTION

The present invention comprises a device that can attract and catch fish while removing the twist in twisted fishing line. The apparatus is comprised generally of a body member configured to rotate in a predetermined direction when drawn through water, means for attaching the body member to a fishing line, hook means attached to the body member and adapted for rotation and travel therewith and means for minimizing the rotation of the hook means. In its preferred form, the device consists of a body member that is adapted to be fastened directly to the end of the twisted line. The body member is shaped such that when drawn through the water, it imparts a rotary motion to the end of the twisted line thus causing it to be untwisted. A swivel member, in conjunction with hook dressing means is preferably used to attach a hook or hooks to the body member such that the rotary motion imparted to the hook is disrupted to thereby cause the hook to rotate to a lesser degree than does the body member. It will be appreciated that the hook is attached to the body member to catch the fish that are attracted to the lure.

It is an object of the present invention to provide a device that will catch and attract fish while removing twist from twisted fishing line with a minimal amount of casts. Accordingly, the present invention provides solutions to the aforementioned problems encountered when using twist removing devices. However, these and other details, objects and advantages of the invention will become apparent as the detailed description of the present invention proceeds.

BRIEF DESCRIPTION OF THE DRAWINGS

The preferred embodiment of the invention will now be described by way of example only, with reference to the accompanying Figures wherein like members bear like reference numerals and wherein.

DETAILED DESCRIPTION OF THE PREFERRED EMBODIMENTS

Referring now to the drawings which are for purposes of illustrating the preferred embodiments of the present invention only and not for purposes of limiting the same, the Figures generally show a combination fish lure and line untwisting device generally designated as 10. More particularly and with reference to FIG. 1 there is shown a fish lure and line untwisting device 10 having a body member 12 that has a leading end 14 and a trailing end 16. Preferably, the body member 12 is conical-shaped, with the leading end 14 being located at the smallest end thereof. The body member is preferably fabricated in the following three sizes: (1) a small size having a length of approximately 3 inches and tapering from ⅜ inch in diameter to 3/16 inch in diameter; (2) a medium size having a length of approximately 4 inches to 4½ inches and tapering from 1 inch in diameter to ¼ inch in diameter; and (3) a large size having a length of approximately 5 inches to 6 inches and tapering from 1¼ inches in diameter to ⅜ inch in diameter. However, one of ordinary skill in the art will appreciate that the body member 12 may be provided in a myriad of suitable shapes and sizes and, as such, the above-mentioned sizes are provided by way of example only and should not be construed as limiting the present invention.

Figure 1:
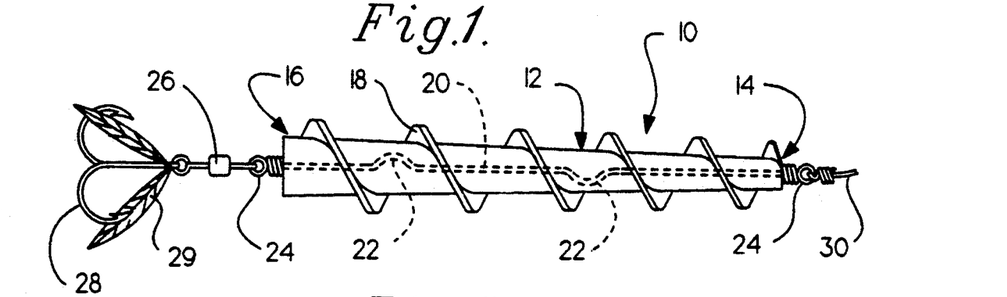
FIG. 1 is a side view of the fish lure and line untwisting device of the present invention.

In addition, the body member 12 is preferably constructed from material that is somewhat buoyant, yet heavy enough to cause a twisted loop of fishing line to be pulled from the fishing reel spool when the fishing lure and line untwisting device 10 is cast into the water. For example, the sizes described above would preferably have the following weights: small: ⅜ ounce; medium: ⅝ to ⅞ ounce; and large: 1 to 1½ ounces. The skilled artisan will further appreciate, however, that the fish lure and line untwisting device 10 of the present invention may have a number of other suitable weights depending upon the type of material being used. In addition to the above described weights and properties, the body member 12 is preferably fabricated from a material that is somewhat shatter-resistant and can tolerate fluctuations in the ambient temperature without substantially affecting that property. Semi-hard rubber has been found to exhibit the above-described properties. However, other suitable materials such as, for example, nylon, plastic and wood may be successfully used.

Attached to the outer surface of the body member 12 is a continuous spin causing, helical blade member 18. The helical blade member 18 is designed to cause a rotary motion to be imparted to the body member 12 as the fish lure and line untwisting device 10 is drawn through the water. In the preferred embodiment, the helical blade member 18 is fabricated from the same material that comprises the body member 12 and is preferably molded thereto. However, the helical blade member 18 may be fabricated from other suitable materials and may be attached to the body member 12 by any suitable fastening means such as, for example, by gluing. The helical blade member 18, when viewed from the lead end 14 of the body member 12 preferably spirals to the right and, as such, somewhat resembles a right-handed thread. However, the helical blade member 18 may be provided in a number of other configurations adapted to cause a rotation to be imparted to the body member 12 as the present invention is drawn through the water. The skilled artisan will further appreciate that by increasing or decreasing the number of spiralled blades per inch of body member 12 or by adjusting the angular orientation of the helical blade 18, the amount of line that is untwisted per one revolution of the reel's winding member may be altered.

Extending through the center of the body member 12 is a continuous elongated member 20. Preferably, the continuous elongated member 20 consists of wire having at least one rotation preventing kink 22 therein. As shown in FIG. 1, the preferred continuous elongated member 20 is received within the body member 12 and has two rotation preventing kinks 22 provided therein. As further shown in FIG. 1, the ends of the continuous elongated member 20 protrude through the leading end 14 and the trailing end 16 of the body member 12 and terminate in eyelets 24. The skilled artisan will readily appreciate, however, that the continuous elongated member 20 may be eliminated by fastening commercially available eyelets (not shown) to the lead end 14 and the trail end 16 of the body member 12.

The twisted fishing line 30 is directly attached to the lead end eyelet 24 so that the rotary motion of the body member 12, as it is drawn through the water, is directly applied to the end of the twisted line 30. A commercially available swivel member 26 is fastened to the eyelet 24 located at the trailing end 16 of the body member 12 and a hook 28 is attached thereto as shown in FIG. 1. The hook 28 preferably consists of a treble hook. However, other hook combinations may be successfully used. The swivel member 26 serves to disrupt transfer of the rotary motion of the body member 12 to the hook 28. The skilled artisan will appreciate that it is desirable to disrupt the rotary motion imparted to the hook 28 so that the hook rotates to a lesser degree than does the body member 12. Ideally, the hook 28 will not rotate at all when the apparatus 10 is drawn through the water. However, any rotary motion that is less than the rotary motion achieved by the body member 12 is acceptable. In addition, various types of hook dressing materials 29 such as, for example, feathers and the like are preferably attached to the hook 28 to minimize the rotation of the hook 28 while increasing the device's attractiveness to fish. In the alternative, a rudder-like device (not shown) may also be attached to the hook 28 or between the hook 28 and the swivel 26 to disrupt the rotary motion imparted to the hook 28.

To use the fish lure and line untwisting device 10 of the present invention, the twisted fishing line 30 is directly tied onto the eyelet 24 located at the lead end 24 of the body member 12. Thereafter, the fish lure and line untwisting device 10 is cast into the water and is retrieved therefrom. The device 10 is drawn through the water by reeling the twisted fishing line 30 back onto the fishing reel (not shown). As the device 10 is drawn through the water, the interaction between the helical blade members 18 and the water causes a rotary motion to be imparted to the body member 12. Because the end of the twisted line 30 is attached directly to the body member 12, the rotational motion of the body member 12 is directly transferred to the twisted line 30, thereby causing the twist to be removed therefrom.

Those of ordinary skill in the art will also recognize that the rotation preventing kinks 22 as described above may be omitted to permit the body member to freely rotate upon the elongated member 20. When used in that manner, the present invention can function solely as a fish lure.

Figure 2:
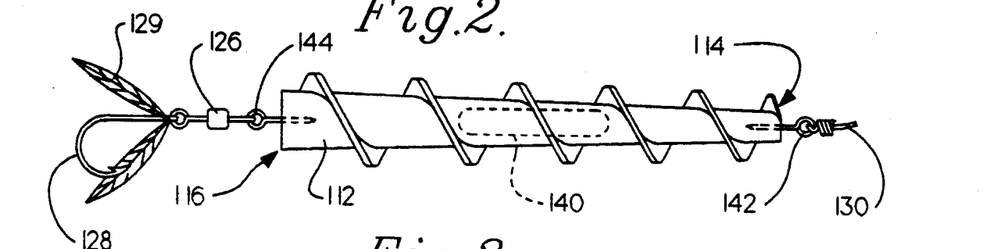
FIG. 2 is a side view of another embodiment of the fish lure and line untwisting device of the present invention.

It is desirable for the fish lure and line untwisting device 10 of the present invention to float low on the water as opposed to floating directly on the water's surface or sinking to the bottom. Accordingly, to control the floating position of the device in the water, in another embodiment of the present invention, a buoyancy chamber 140 can be provided within the body member 112 as shown in FIG. 2. The buoyancy chamber 140 comprises a pocket of air that is trapped within the body member 112. Those of ordinary skill in that art will appreciate that by adjusting the size of the buoyancy chamber 140, the body member 112 may be caused to float higher or lower in the water.

The body member 112 may be fabricated from the same materials and in the same manner as described above. However, in that embodiment, an eyelet 142 is attached to the lead end 114 of the body member 112 by conventional fastening means such as, for example, by screwing or gluing. As was described above, the twisted fishing line 130 is then tied to the eyelet 142. In addition, an eyelet 144 is attached to the trailing end 116 of the body member 112 in a similar manner. As was discussed above, a conventional swivel member 126 is attached to the eyelet 144 and a hook 128 is attached to the swivel member 126. In addition, to further disrupt the rotary motion imparted to the hook 128, commercially available hook dressing material 129 such as feathers and the like is preferably attached to the hook 128. It will be appreciated that fish are attracted by the bubbling and splashing action of the rotating body member 112.

Figure 3:
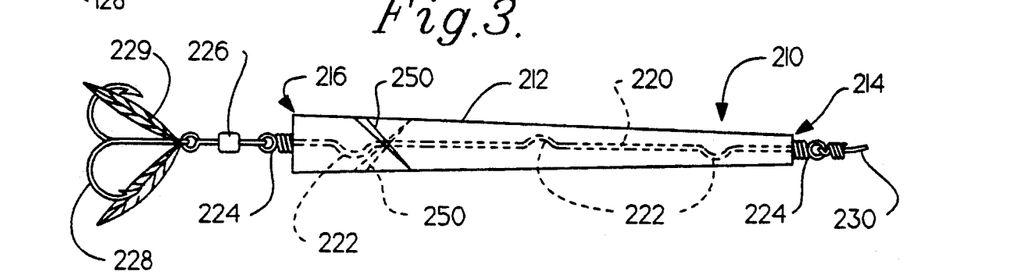
FIG. 3 is a plan view of another embodiment of the fish lure and line untwisting device of the present invention.
Figure 4:
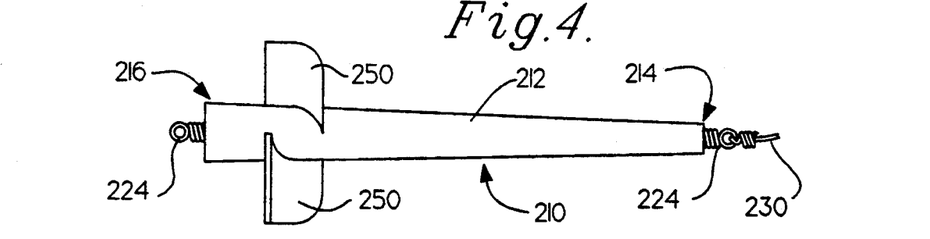
FIG. 4 is a side view of the fish lure and line untwisting device of FIG. 3.
Figure 5:
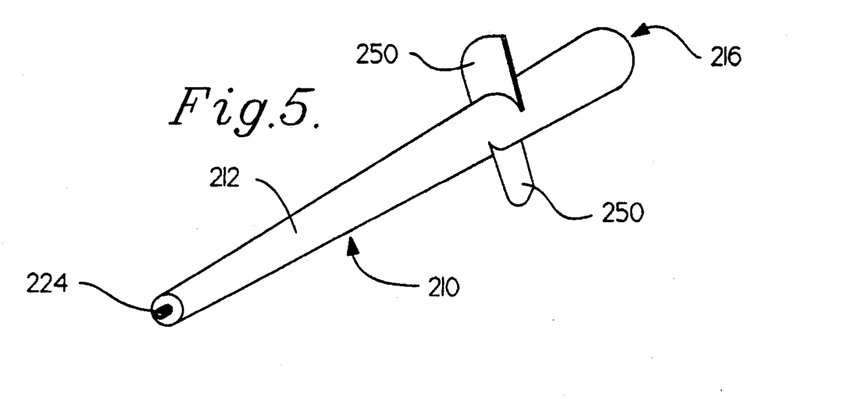
FIG. 5 is a perspective view of the fish lure and line untwisting device of FIGS. 3 and 4.

Another embodiment of the present invention is illustrated in FIGS. 3–5. That embodiment comprises a conical-shaped body member 212 having a leading end 214 and a trailing end 216 that is fabricated in the manner previously described hereinabove. Extending through the body member 212 is a continuous elongated member 220 that protrudes through the leading end 214 and the trailing end 216 of the body member 212 to terminate in eyelets 224. To prevent the continuous elongated member 220 from rotating within the body member 212, at least one kink 222 is provided therein. However, to insure that the elongated member 220 does not rotate within the body member 212, a total of three kinks 222 are preferably provided as shown in FIG. 3. Once again, however, those of ordinary skill in the art will appreciate that the continuous elongated member 220 may be eliminated by attaching conventional eyelet members (not shown) to the leading end 214 and the trailing end 216 of the body member 212 as was discussed above. Further, if desired, this embodiment may be fabricated to function solely as a fish lure by omitting kinks 222 from the elongated member 220 such that the body member 212 can freely rotate upon the continuous elongated member 220.

The twisted fishing line 230 is tied to the eyelet 224 that is located at the leading end 214 of the body member 212. Attached to the eyelet 224 that is located at the trailing end 216 of the body member 212 is a conventional swivel member 226 that is adapted to disrupt the rotary motion imparted to a hook member 228 attached to the end of the swivel 226 as shown in FIG. 3. In addition, hook dressing means 229 such as, for example, feathers are used to disrupt the rotary motion imparted to the hook member 228.

To provide the body member 212 with the desired rotary motion, preferably two blade members 250 configured as shown in FIGS. 4 and 5, are attached to the body member 212 near the trailing end 216 thereof. However any number of rotation causing blade members 250 may be used. Preferably, the blade members 250 are molded to the body member 212, however, the blade members 250 may be attached to the body member 212 by any suitable fastening means. It will be understood that when the fish lure and line untwisting device 210 of the present invention is drawn through the water, the blades 250 cause it to rotate in a predetermined direction. Further, because the twisted fishing line 230 is directly connected to the device 210 via the eyelet 224, the rotary motion of the device 210 will be imparted to the twisted line 230, thus causing it to be untwisted.

Figure 6:
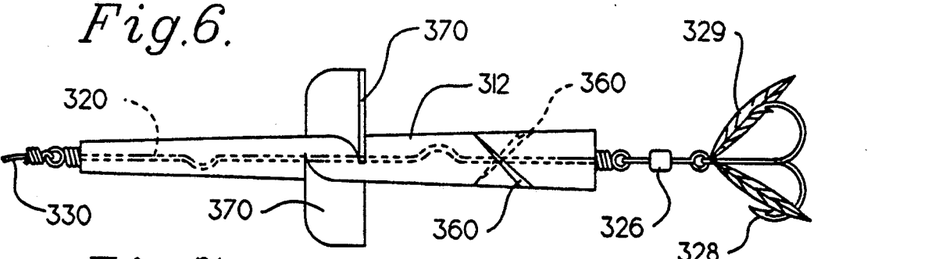
FIG. 6 is a plan view of another embodiment of the fish lure and line untwisting device of the present invention.
Figure 7:
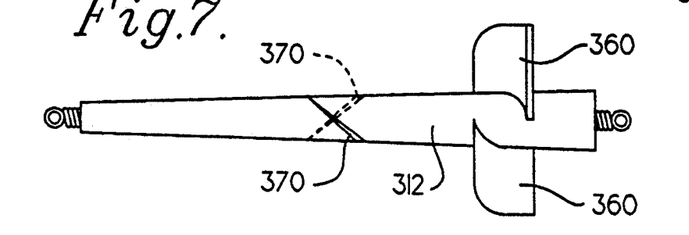
FIG. 7 is a side view of the fish lure and line untwisting device of FIG. 6.
Figure 8:
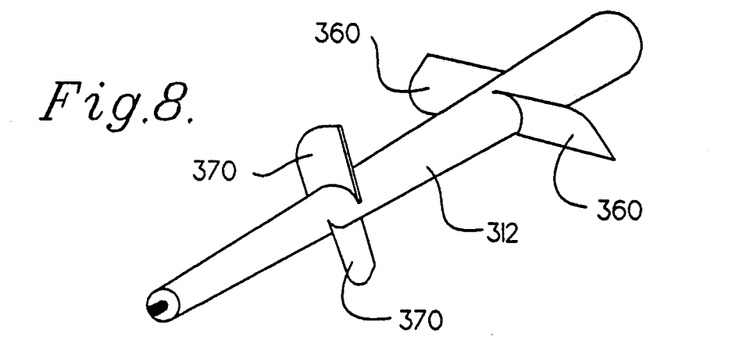
FIG. 8 is a perspective view of the fish lure and line untwisting device of FIGS. 6 and 7.

In yet another embodiment, as illustrated in FIGS. 6–8, the frusto-conical shaped body member 312 may be fabricated from the same materials and in the same manner as the body members of the previously described embodiments. The elongated member 320 preferably has the same attributes as the elongated members described above and, accordingly, the reader will appreciate that the conventional swivel 326, the hook member 328 and the twisted fishing line 330 are interconnected in the same manner as was described hereinabove. In addition, hook dressing means 329 are preferably fastened to the hook member 328 to help disrupt the rotary motion imparted to the hook member 328. In this embodiment, however, there are preferably two sets of blade members 360 and 370 attached to the body member 312 in the manner and orientation illustrated in FIGS. 6 and 7. It will be appreciated that the blades 360 and 370 will cause a rotary motion to be imparted to the body member 312 as it is drawn through the water. It will be further appreciated that any number or combination of rotation causing blade members 360 and 370 may be used.

Figure 9:
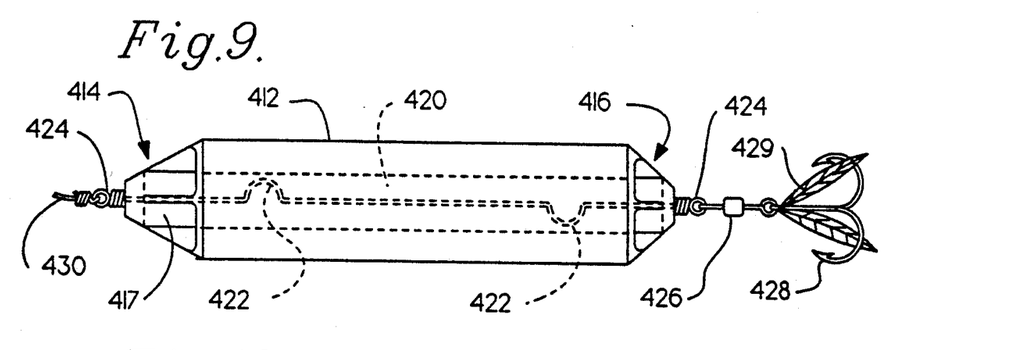
FIG. 9 is a side view of another embodiment of the fish lure and line untwisting device of the present invention with the helical blade members omitted for clarity.
Figure 10:
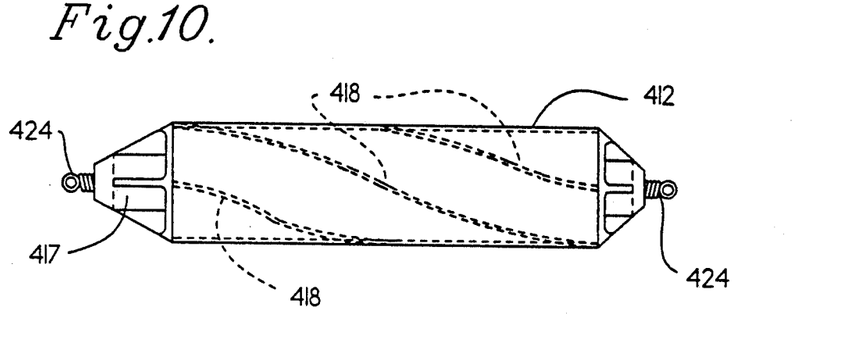
FIG. 10 is a side view of the fish lure and line untwisting device of FIG. 9.
Figures 11, 12:
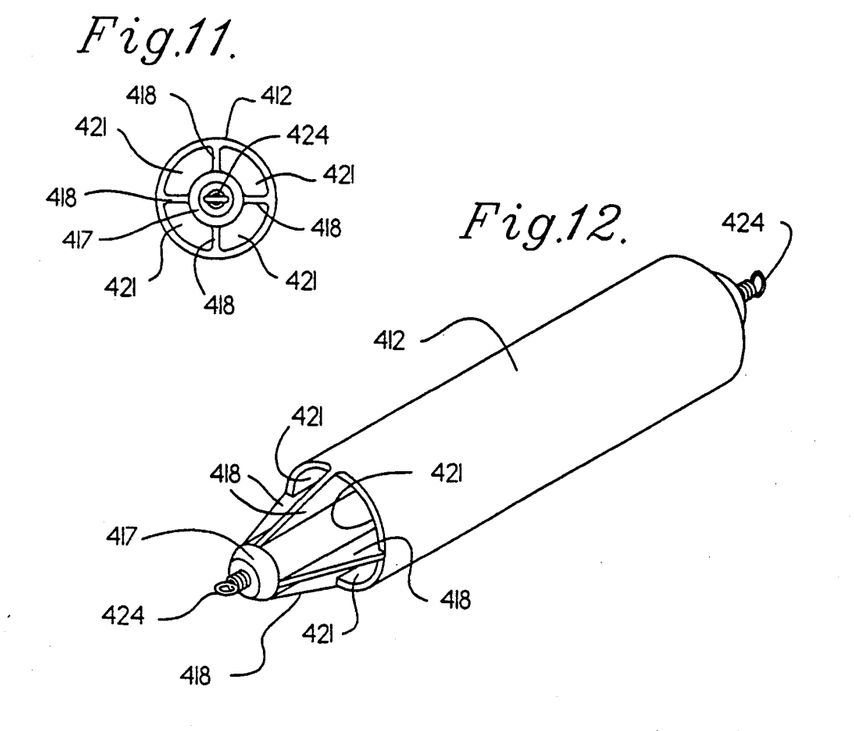
FIG. 11 is a left end view of the fish lure and line untwisting device of FIGS. 9 and 10.
FIG. 12 is a perspective view of the fish lure and line untwisting device of FIGS. 9, 10, and 11.

The embodiment depicted in FIGS. 9–12, has a hollow cylindrical-shaped body member 412. The body member 412 has a leading end 414 and a trailing end 416. A solid cylindrical-shaped core member 417 coaxially extends through the center of the body member 412 as most particularly shown in FIG. 9. As shown in FIGS. 10–12, the core member 417 is attached to the body member 412 by a series of spiralled vanes 418. Received within the core member 417 is an elongated member 420 that has at least one rotation preventing kink 422 provided therein. In the embodiment depicted in FIG. 9, two rotation preventing kinks 422 are provided. In addition, the elongated central member 420 protrudes through the leading end 414 and trailing end 416 of the central core member 417 and is formed into eyelets 424. However, as with the other embodiments described hereinabove, the elongated central member 420 may be eliminated through the use of conventional eyelets (not shown) that are fastened to the leading end 414 and the trailing end 416 of the central core member 417. Further, this embodiment can also be fabricated to function solely as a fishing lure by omitting the rotation preventing kink 422 such that the central core member 417 may freely rotate therearound.

A conventional swivel 426 is attached to the eyelet 424 that is attached to the trailing end 416 of the central core member 417. A hook member 428 is attached as shown in FIG. 9 to the conventional swivel member 426. To disrupt the rotary motion that is imparted to the hook member 428 with respect to the body member 412, commercially available hook dressing material 429 such as feathers and the like is preferably attached to the hook member 428.

As shown in FIGS. 9–11, the spiralled vane members 418 serve to define four, open-ended, spiral-shaped passages 421. However, it will be understood that the number of spiralled vane members 418 may be varied to create any number of desired open-ended spiral-shaped passages 421.

To use the device, a twisted fishing line 430 is tied to the eyelet 424 located at the leading end 414 of the central core member 417. Thereafter, the device is cast into the water. As the device is retrieved through the water by winding the fishing line 430 back onto the fishing reel (not shown), the water is caused to pass through the spiralled passages 421. The interaction between the water and the spiralled vanes causes a rotary motion to be imparted to the cylindrical-shaped body member 412 and the central core member 417. That rotary motion is transferred to the twisted fishing line 430 via the eyelet 424 thereby causing the twisted fishing line 430 to rotate in a predetermined direction.

The skilled artisan will appreciate that all of the above-described embodiments may be provided with a buoyancy chamber as was described above and is depicted in the present FIG. 2. It will be further appreciated that the various body members and rotation causing blade members of the above-described embodiments may be provided in a myriad of different color combinations and finishes. In addition, metallic tapes and finishes may also be used to increase the device's attractiveness to fish.

Figure 13:
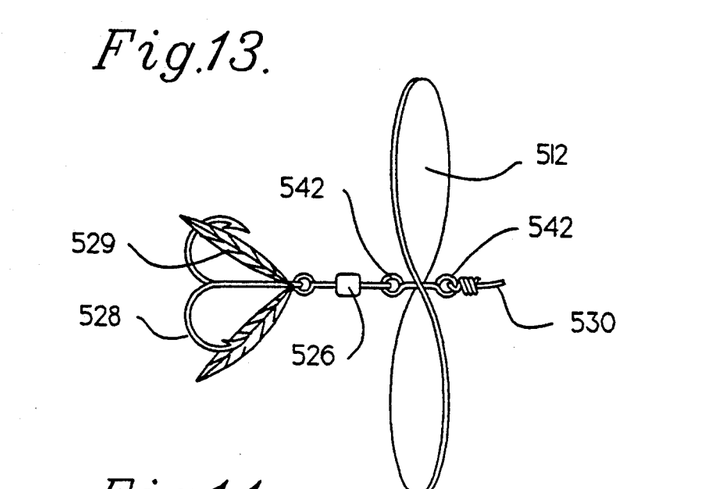
FIG. 13 is a perspective view of another embodiment of the fish lure and line untwisting device of the present invention.

In another embodiment of the present invention as shown in FIG. 13, the body member 512 is provided in the shape of a propeller. An eyelet 542 is provided in the center of the body member 512 for tying the twisted fishing line 530 thereto. In addition, a second eyelet 542 is attached to the center of the body member 512 as shown in FIG. 13. A conventional swivel member 526 is attached to the second eyelet 542 and a hook 528 is attached to the swivel member 526. It will be understood that when the body member 512 is drawn through the water by the twisted fishing line 530, the body member 512, by virtue of its shape, will spin and impart a rotary motion to the twisted fishing line 530 to remove the twist therefrom. As the body member 512 is drawn through the water, the swivel member 526 in conjunction with the hook dressing material 529 serve to disrupt the rotary motion imparted to the hook 528 so that the hook 528 will be ready to catch fish that are attracted to the body member 512. Preferably, the body member 512 is constructed from polished metal material. However, other suitable materials and finishes may also be used.

Figure 14:
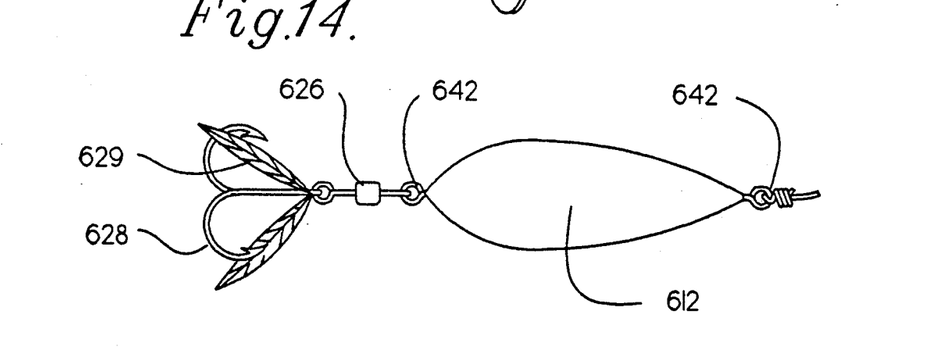
FIG. 14 is a top view of another embodiment of the fish lure and line untwisting device of the present invention.
Figure 15:
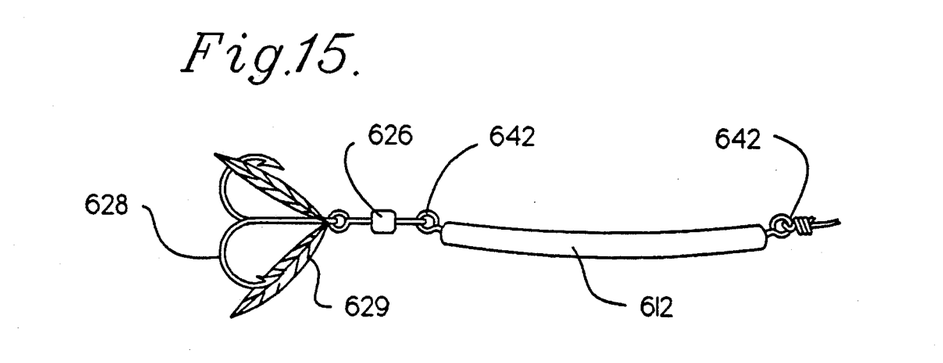
FIG. 15 is a side view of the fish lure and line untwisting device of FIG. 14.

Another embodiment is illustrated in FIGS. 14 and 15. In that embodiment, the body member 612 is provided in the shape of an elliptical spoon. A first eyelet member 642 is attached to the front end of the body member 612 so that the twisted fishing line 630 may be tied thereto. A second eyelet member 642 is attached to the rear end of the body member 612 so that a conventional swivel member 626 may be fastened thereto. A hook 628 is attached to the swivel member 626 to catch any fish that is attracted to the movement of the body member 612. Hook dressing material 629, such as feathers and the like, are preferably attached to the hook member 628 to disrupt the rotary motion imparted thereto. It will be appreciated that, by virtue of its shape, the body member 612 will be caused to rotate as it is drawn through the water. As with the other previously discussed embodiments, the rotary motion of the body member 612 will be imparted to the twisted fishing line to thus remove the twist therefrom.

Figure 16:
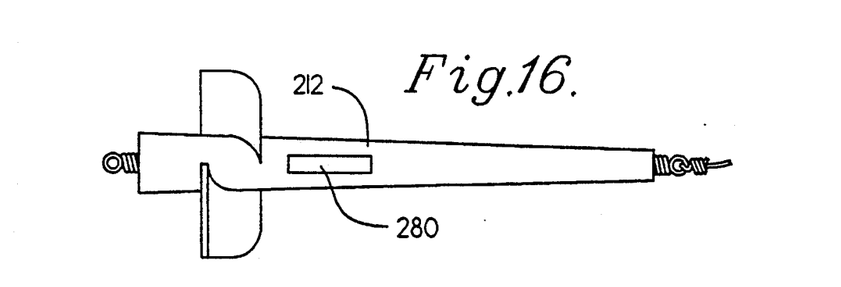
FIG. 16 is a side view of another embodiment of the fish lure and line untwisting device of the present invention.

The skilled artisan will appreciate that a variety of modifications to the above-described embodiments may be made to further enhance the present invention's attractiveness to fish. For example, as illustrated in FIG. 16, an absorbent scent receiving pad 280 may be added to the body member 212. The scent receiving pad 280 preferably consists of a commercially available absorbent polyester material having an adhesive backing. The reader will appreciate that such scent receiving pad 280 may be attached to any of the embodiments herein described to increase the present invention's attractiveness to fish. The scent receiving pad 280 is used by pouring commercially available aromatic fish attractant onto the pad before the twist removing device of the present invention is cast into the water. As the device is drawn through the water, the scent is caused to dissipate from the pad 280 to thus attract fish.

Figure 17:
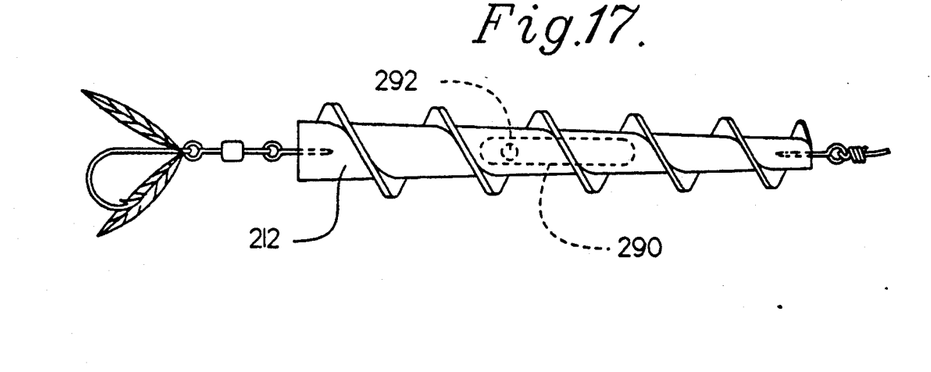
FIG. 17 is a side view of another embodiment of the fish lure and line untwisting device of the present invention.

Yet another way to increase the fish appeal of the present invention is illustrated in FIG. 17. In particular, a sound chamber 290 is provided in the body member 212. The sound chamber 290 consists of a hollowed out area in the center of the body member 212 that is adapted to contain at least one noise generating member 292 therein. Preferably, the noise generating member 292 consists of a round ball-like member that may freely roll around in the sound chamber 290. It will be appreciated that as the body member 212 is drawn through the water, the rotary motion thereof will cause the noise generating member 292 to move within the chamber 290 and produce various fish attracting sounds as it contacts the sides of the chamber 290.

As such, the present invention provides a means for removing the twist from a fishing line while also providing an opportunity to catch fish. However, it will be appreciated that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for catching fish and removing twist from twisted fishing line in a minimal amount of casts, comprising:
   a body member configured to rotate in a predetermined direction when drawn through water;
   means for attaching said body member to a fishing line so that said body member can be drawn through the water by said fishing line and unimpededly impart a rotary motion thereto such that the twist in said twisted fishing line is substantially removed by drawing said body member through the water a predetermined number of times;
   hook means attached to said body member by hook means attaching means, said hook means attaching means permitting said hook means to travel with said body member; and
   means for disrupting the rotary motion imparted to said hook means such that said hook means rotates to a lesser degree than said rotational motion of said body member.

2. The apparatus of claim 1 wherein said body member comprises:
   a frusto-conical shaped member having a first end and a second end, said first end of said frusto conical-shaped member being attachable to said fishing line by said body member attaching means and said second end of said frusto-conical shaped member being attachable to said hook means by said hook means attaching means; and
   at least one helical blade member protruding outwardly from and non-rotatably attached to said frusto conical-shaped member such that when said frusto-conical shaped member is drawn through the water said blade member interacts with the water to cause said frusto-conical shaped member to rotate in said predetermined direction.

3. The apparatus of claim 1 wherein said body member has opposing ends and said means for attaching said body member to said fishing line comprises an elongate continuous member that is non-rotatably received in said body member and protrudes from each end thereof, said elongate continuous member having eyelet members formed therein, one said eyelet member being adapted for attachment to said fishing line, and another said eyelet being adapted for attachment to said means for attaching said hook means to said body member.

4. The apparatus of claim 3 wherein said elongate continuous member comprises a wire non-rotatably received in said body member.

5. The apparatus of claim 1 wherein said means for disrupting the rotary motion imparted to said hook means comprises:
   an eyelet member non-rotatably attached to said body member; and
   a swivel member attached to said eyelet member and having means for attaching said hook means thereto such that the rotary motion imparted to said hook means is disrupted and said hook means rotates to a lesser degree than said body member.

6. The apparatus of claim 5 wherein said means for disrupting the rotary motion imparted to said hook means further comprises hook dressing means.

7. The apparatus of claim 1 wherein said means for attaching said body member to said fishing line comprises a line-receiving eyelet non-rotatably attached to said body member.

8. The apparatus of claim 1 further comprising means for controlling the depth of said body member as said body member is drawn through the water.

9. The apparatus of claim 8 wherein said means for controlling the depth of said body member comprises a buoyancy chamber in said body member.

10. The apparatus of claim 1 wherein said body member is propeller shaped.

11. The apparatus of claim 1 wherein said body member is provided in the shape of an elliptical spoon.

12. The apparatus of claim 1 further comprising means for attracting fish to said body member when said body member is drawn through water.

13. The apparatus of claim 12 wherein said means for attracting comprises means attached to said body member for receiving an aromatic fish attractant.

14. The apparatus of claim 12 wherein said means for attracting comprises:
   a hollow sound chamber in said body member; and
   means received within said hollow sound chamber to create a sound as said body member is drawn through water.

15. The apparatus of claim 12 wherein said fish attracting means comprises feathers attached to said hook means.

16. Apparatus for catching fish and removing twist from twisted fishing line in a minimal amount of casts, comprising:
   a body member constructed to be drawn through water;
   means for attaching said body member to a fishing line so that said body member can be drawn through the water by said fishing line;
   means for causing said body member to rotate in a predetermined direction as said body member is drawn through the water to unimpededly impart a rotary motion to the twisted fishing line such that the twist therein is substantially removed therefrom by drawing said body member through the water a predetermined number of times;
   hook means attached to said body member by hook means attaching means, said hook means attaching means permitting said hook means to travel with said body member; and
   means for disrupting the rotary motion imparted to said hook means such that said hook means rotates to a lesser degree than said rotational motion of said body member.

17. The apparatus of claim 16 wherein said body member is frusto-conical shaped.

18. The apparatus of claim 17 wherein said rotation causing means comprises at least one blade attached to said body member.

19. Apparatus for catching fish and removing twist from twisted fishing line in a minimal amount of casts, comprising:
   a hollow body member constructed to be drawn through water;
   means for attaching said body member to a fishing line so that said body member can be drawn through the water with said fishing line;
   rotation means attached to said body member for causing said body member to unimpededly impart a rotary motion in a predetermined direction as said body member is drawn through the water such that any twist in said fishing line is substantially removed from said fishing line when said body member is drawn through the water a predetermined number of times;

hook means attached to said body member by hook means attaching means, said hook means attaching means permitting said hook means to travel with said body member; and means for disrupting the rotary motion imparted to said hook means such that said hook means rotates to a lesser degree than said body member.

20. The apparatus of claim 19 wherein said rotation means comprises a plurality of spiralled vanes received within said hollow body member, said spiralled vanes defining a plurality of spiralled, water-receiving passages extending through said hollow body such that when said hollow body is drawn through water, water is caused to pass through said spiralled passages causing said body member to impart said predetermined rotary motion to said fishing line.

* * * * *